United States Patent
Kartmann et al.

(10) Patent No.: US 12,515,664 B2
(45) Date of Patent: Jan. 6, 2026

(54) METHOD AND APPARATUS FOR RECOGNIZING A TOWING OPERATION OF A VEHICLE

(71) Applicant: Robert Bosch GmbH, Stuttgart (DE)

(72) Inventors: Bruno Kartmann, Moeglingen (DE); Michael Egert, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 42 days.

(21) Appl. No.: 18/598,753

(22) Filed: Mar. 7, 2024

(65) Prior Publication Data

US 2024/0359689 A1    Oct. 31, 2024

(30) Foreign Application Priority Data

Apr. 26, 2023 (DE) ............. 10 2023 203 883.8

(51) Int. Cl.
*B60W 30/18* (2012.01)

(52) U.S. Cl.
CPC .......... *B60W 30/18027* (2013.01); *B60W 30/18109* (2013.01); *B60W 2540/10* (2013.01); *B60W 2554/402* (2020.02); *B60Y 2300/28* (2013.01)

(58) Field of Classification Search
CPC ..... B60W 30/18027; B60W 30/18109; B60W 30/18009; B60W 2530/203–207; B60W 2540/10; B60W 2554/402; B60W 50/0098; B60W 50/12; B60W 2520/105; B60Y 2300/28
See application file for complete search history.

(56) References Cited

U.S. PATENT DOCUMENTS

| | | | |
|---|---|---|---|
| 2001/0023384 A1* | 9/2001 | Nishimura | B60W 30/18 701/59 |
| 2013/0151096 A1* | 6/2013 | Fyie | F16H 59/08 701/62 |
| 2018/0273034 A1* | 9/2018 | Gesch | B60W 30/146 |
| 2019/0359125 A1* | 11/2019 | Nagata | B60W 40/13 |
| 2020/0086846 A1* | 3/2020 | Kuroda | B60W 40/105 |
| 2020/0164890 A1* | 5/2020 | Shin | B60K 6/48 |
| 2021/0039641 A1* | 2/2021 | Lee | B60W 10/10 |
| 2022/0324433 A1* | 10/2022 | Salter | B60W 30/18172 |
| 2023/0219566 A1* | 7/2023 | Fukui | B60W 30/0956 701/301 |
| 2024/0067220 A1* | 2/2024 | Shahriari | B60W 30/045 |

FOREIGN PATENT DOCUMENTS

DE    102014003256 A1    9/2015

* cited by examiner

Primary Examiner — Lori Wu
(74) Attorney, Agent, or Firm — NORTON ROSE FULBRIGHT US LLP

(57) ABSTRACT

A method and an associated apparatus for recognizing a towing operation of a vehicle. A towing operation is recognized by detecting an acceleration of the vehicle immediately after activation of the vehicle ignition and at the same time detecting that there is no actuation of the accelerator pedal or no torque request from a driver assistance system. Upon recognition of the towing operation, an automatic function that intervenes in the acceleration, deceleration, or steering of the towed vehicle is blocked.

9 Claims, 2 Drawing Sheets

METHOD AND APPARATUS FOR RECOGNIZING A TOWING OPERATION OF A VEHICLE

CROSS REFERENCE

The present application claims the benefit under 35 U.S.C. § 119 of German Patent Application No. DE 10 2023 203 883.8 filed on Apr. 26, 2023, which is expressly incorporated herein by reference in its entirety.

FIELD

The present invention relates to a method and an associated apparatus for recognizing a towing operation of a vehicle, in which a towing operation is recognized by detecting an acceleration of the vehicle immediately after activation of the vehicle ignition and at the same time detecting that there is no actuation of the accelerator pedal or no torque request from a driver assistance system, and, upon recognition of the towing operation, an automatic function that intervenes in the acceleration, deceleration or steering of the towed vehicle is blocked.

BACKGROUND INFORMATION

A method for preventing the output of collision warnings and/or distance warnings in motor vehicles comprising collision warning output means and/or distance warning output means is described in German Patent Application No. DE 10 2014 003 256 A1. For this purpose, the method comprises a monitoring step in which values of one or more predefined vehicle parameters are acquired. The method further comprises an evaluation step in which each of the vehicle parameters is respectively assigned either a suspected towing situation or normal forward travel as a function of the acquired value or values of the respective vehicle parameter.

SUMMARY

Driver assistance systems, which output a driver warning if the ego vehicle is following a preceding vehicle at too close a distance and, if necessary, trigger an automatically triggered emergency braking, are being used more and more in modern vehicles. This can be provided both in the context of manual vehicle control by the driver and in the context of automatic distance control systems. If a vehicle comprising such a driver assistance system is being towed and the ignition of the towed vehicle is activated, such a warning or such emergency braking is unwanted because this will disrupt or impede the towing operation. Deactivating the ignition of the towed vehicle should be avoided, because the support for the systems such as brake boosters or steering boosters would no longer be available during the towing operation.

The present invention relates to reliably recognizing a towing operation of a vehicle comprising a corresponding driver assistance system. This object may be achieved according to features of the present invention.

According to an example embodiment of the present invention, a towing operation is recognized here by detecting an acceleration of the vehicle immediately after activation of the vehicle ignition and detecting that there is no actuation of the accelerator pedal and no torque request from a driver assistance system, and, upon recognition of the towing operation, an automatic function that intervenes in the acceleration, deceleration or steering of the towed vehicle is blocked. Advantageous embodiments of the present invention are disclosed herein.

In the context of the present invention, the term "ignition" of a vehicle is understood to not only mean that the ignition of a mixture-compressing internal combustion engine is activated, but the term "ignition" also means that the terminal 15 of the ignition lock has been activated or the terminal 15 of the engine on/off switch has been activated.

Typically, to start a vehicle, an ignition key is turned or a button is pressed and the vehicle systems are energized and activated in a first shift position. This activation usually takes place by means of the so-called terminal 15, which activates vehicle systems prior to starting the engine and is usually referred to as ignition.

It is advantageously provided that the "recognition of a towing operation immediately after activation of the vehicle ignition" occurs if no driving operation has taken place between the activation of the vehicle ignition and the recognition of the towing operation, i.e., no vehicle acceleration or vehicle deceleration of the vehicle has been implemented in response to an actuation of the accelerator pedal or a torque request from a driver assistance system. The idea of "activation of the vehicle ignition" "immediately" after activating the vehicle ignition is not limited in time and can last for any length of time. It does, however, mean that no active driving operation in which the vehicle was moved by its own engine power can have taken place between the activation of the terminal 15 or the activation of the ignition and the recognition of the towing situation. This is intended to prevent the vehicle from being unable to recognize a towing situation in the event of a malfunction without deactivating and reactivating the ignition. This is intended to ensure that the vehicle must have at least been parked and the ignition deactivated and reactivated between the towing operation and the uninterrupted vehicle operation.

According to an example embodiment of the present invention, it is furthermore advantageous that recognizing the towing operation further includes detecting that the hazard warning lights of the vehicle are activated. The detection of the activation of the hazard warning lights is not a necessary feature for recognizing a towing operation, especially since the hazard warning lights are often also activated in other driving situations. However, the activation of the hazard warning lights is a good plausibilization feature with which the recognition of a towing operation can be recognized with an even higher probability.

According to an example embodiment of the present invention, it is furthermore advantageous that the recognized towing operation remains active until the accelerator pedal is actuated or the driving assistance system is activated and the hazard warning lights have been deactivated at the same time as one of said conditions. The recognized towing operation remains activated until the specified conditions are met, even if the vehicle has been parked for a certain period of time in the interim.

The end of the towing operation is recognized only by the occurrence of both the deactivation of the hazard warning lights and requests for torque intervention by a vehicle longitudinal control device, for example actuation of the accelerator pedal by the driver or output of a torque request by an assistance system for vehicle longitudinal control that has since been activated.

It is furthermore advantageous that the recognized towing operation is activated when a minimum time t since the last operation of the vehicle in which no towing situation was recognized has elapsed. If it is determined that the vehicle was active during the last driving operation, which does not mean a towing situation since the vehicle was able to drive under its own power, a towing operation should only be possible in the next ignition cycle if the vehicle has been parked for a minimum time t in the interim. This is intended to ensure that a towing situation cannot be established as a result of a short stop. Attaching a tow rope and preparing the vehicle for towing typically takes a minimum amount of time, which is used here as an additional plausibility check. Possible periods of time t here are 15 minutes or 30 minutes, preferably 60 minutes, for instance. This feature of the minimum time t is additionally used to plausibility check the recognition of a towing operation.

According to an example embodiment of the present invention, it is furthermore advantageous that the recognized towing operation is reactivated if a towing operation was recognized in the preceding period of time in which the ignition was activated in the vehicle. If a towing situation of the ego vehicle was recognized during an ignition cycle, the towing operation is recognized after deactivation of the ignition and subsequent reactivation of the ignition, i.e. in the subsequent ignition cycle, even without waiting for the minimum period of time t required above to elapse. The use of the minimum period of time t is thus only intended to serve as a plausibility check when the towing situation is first recognized. However, the towing situation is recognized in the subsequent ignition cycles even without waiting for the minimum time t to elapse, and it is assumed that the towing operation continues until the plausible conditions for the end of the towing operation are detected.

According to an example embodiment of the present invention, it is furthermore advantageous that the automatic function that intervenes in the acceleration, deceleration or steering of the towed vehicle is an automatically triggered emergency braking, an automatically triggered emergency evasion function, or a warning braking or an automatic deceleration of the vehicle or a combination thereof. The automatic function is therefore a driver assistance function that intervenes in the longitudinal guidance of the vehicle and/or the lateral guidance of the vehicle in order to avoid collisions in collision situations or at least reduce their severity.

Also provided according to the present invention are an apparatus and a computer program product and a machine-readable storage medium on which the computer program product is stored, in which the described method steps according to the present invention are respectively configured as corresponding device features.

The method of the present invention can be implemented in software or hardware, for instance, or in a mixed form of software and hardware, for example in a control unit.

The approach presented here according to the present invention also provides a driver assistance function with collision avoidance which is configured to carry out, control or implement the steps of a variant of the method presented here in corresponding devices.

The driver assistance function with collision avoidance can be an electrical device comprising at least one computing unit for processing signals or data, at least one memory unit for storing signals or data and at least one interface and/or communication interface for reading in or outputting data embedded in a communication protocol. The computing unit can be a signal processor, a so-called system ASIC or a controller for processing sensor signals and outputting data signals as a function of the sensor signals, for instance. The memory unit can be a flash memory, an EEPROM or a magnetic memory unit, for example. The interface can be configured as a sensor interface for reading in the sensor signals from a sensor and/or as an actuator interface for outputting the data signals and/or control signals to an actuator. The communication interface can be configured to read in or output the data wirelessly and/or by wire. The interfaces can also be software modules that are provided on a microcontroller alongside other software modules, for example.

A computer program product or a computer program comprising program code that can be stored on a machine-readable carrier or storage medium, such as a semiconductor memory, a hard disk memory or an optical memory, and can be used to carry out, implement and/or control the steps of the method according to one of the above-described embodiments is advantageous as well; in particular when the program product or program is executed on a computer, a programmable control unit or a similar apparatus.

It should be noted that some of the possible features and advantages of the present invention are described here with reference to different embodiments as methods for recognizing a towing situation and preventing actuator intervention in the vehicle longitudinal control and/or vehicle lateral control. A person skilled in the art will recognize that the features can be suitably combined, adapted, or interchanged to arrive at further embodiments of the present invention.

BRIEF DESCRIPTION OF THE DRAWINGS

Embodiment examples of the present invention are explained in the following with reference to the figures.

DETAILED DESCRIPTION OF EXAMPLE EMBODIMENTS

Figure 1:
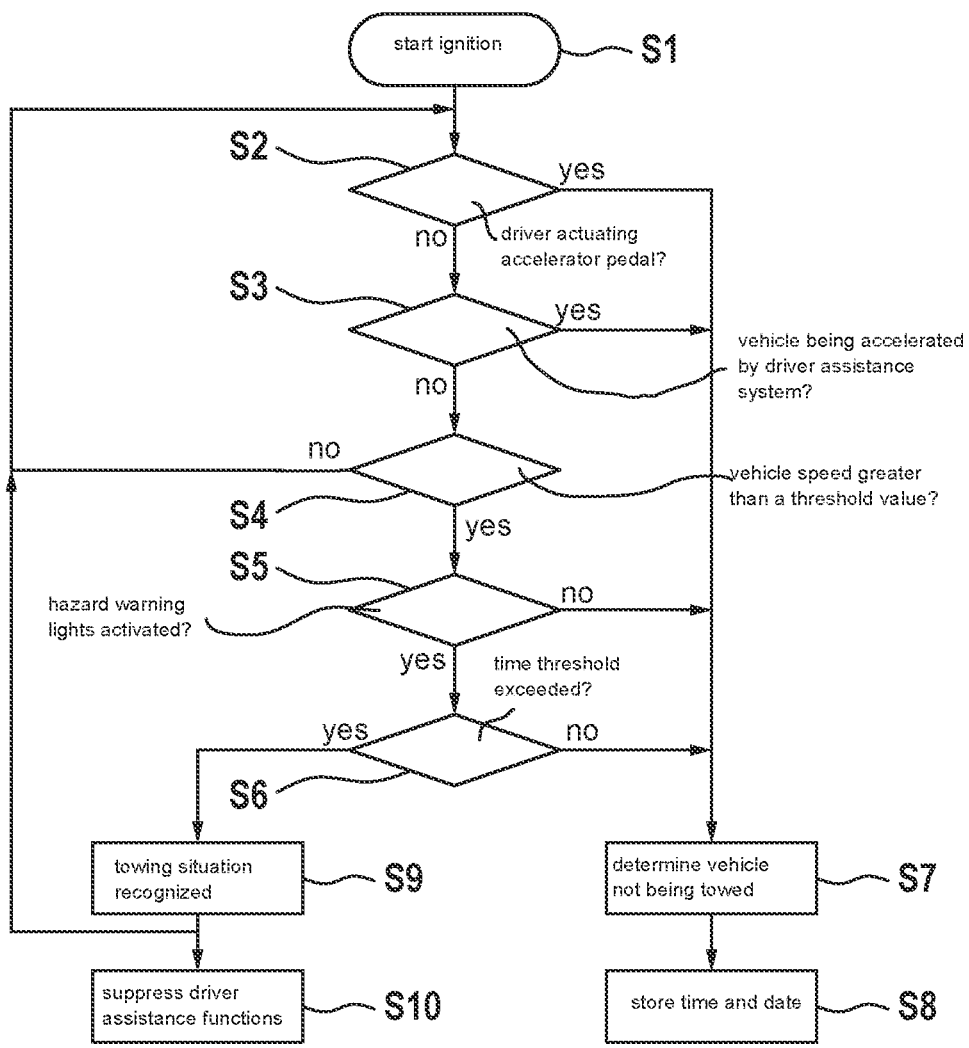
FIG. 1 shows a schematic flowchart of an embodiment of the method according to the present invention.

FIG. 1 shows an example flowchart for an embodiment of the method according to the present invention, which begins in step S1 by starting the ignition of the vehicle.

This is usually accomplished using an ignition key actuated by the driver, which activates the contact terminal 15. Alternatively, a start-stop button or an engine on/off button can be pressed to contact the terminal contact 15. Activating the terminal 15 starts most of the systems installed in the vehicle; the installed systems are at least initialized with this step and prepared for activation. Vehicles without ignition, for example electric vehicles or vehicles with a diesel engine, also have this terminal 15 contact, which is referred to hereinafter as ignition, even if these vehicles do not have ignition in the actual sense.

After step S1, the method is continued in step S2, which checks whether the driver is actuating the accelerator pedal. If the accelerator pedal is being actuated, the method branches to yes in step S2 and is continued in step S7 which will be discussed later. In this case, the driver is actuating the accelerator pedal and making torque requests. If the accelerator pedal is not being actuated by the driver, the method is continued in step S3 which checks whether the vehicle is being accelerated by a driver assistance system. Vehicles often comprise driving assistance systems that output torque requests to the vehicle longitudinal control, for example in the form of acceleration requests or deceleration requests, or even torque requests to a lateral control, for example an electrically controllable steering system. If a torque request is currently being output by one of the vehicle systems, step S3 branches to yes and is continued in step S7 which will be discussed later. If no torque request from a driver assistance system is output in step S3, the method is continued in step S4, which checks whether the vehicle speed is greater than a threshold value, for example a threshold value of 5 km/h or 10 km/h. If it is determined in step S4 that the vehicle is slower than the speed threshold value of, for example, 5 km/h or 10 km/h, S4 will branch to no and is continued in step S2. In this case, the vehicle is stationary or in a very slow rolling state because vehicle is moving without a torque request from the driver or a driver assistance system, which was checked in steps S2 and S3.

If step S4 branches to yes, a speed of the vehicle is above a defined speed threshold of, for example, 5 km/h or 10 km/h, which indicates a driving operation of the vehicle, even though no torque request was made by the driver via the accelerator pedal or by a driver assistance system in steps S2 and S3. This operating state, in which a vehicle speed is greater than a speed threshold value but no torque request has been made by the driver or a driver assistance system, indicates that the vehicle is currently being towed and the speed is being established by the towing vehicle.

After the method has branched to yes in step S4, a plausibility check step takes place, which is represented by S5. For this purpose, step S5 checks whether the hazard warning lights of the vehicle have been activated. If the hazard warning lights are not activated, it is concluded that there is no towing situation, but rather that the vehicle speed is above the predetermined speed threshold value and that a specific driving situation without a torque request by the driver or a driver assistance system is occurring, for example because the vehicle is rolling downhill while in neutral. If the plausibility check step S5 determined that the hazard warning lights are activated, the method in S5 branches to yes and is continued in the following step S6.

Step S6 checks how long the period of time t is, i.e. the time that has passed since the last vehicle deactivation. The time of the last vehicle deactivation is used to determine at what time the vehicle was last driven under its own power and parked. The period of time t until restarting the ignition or activating the terminal 15 has to be greater than a predetermined, further threshold value. If this time threshold value $t_s$ is not exceeded, it is assumed that the vehicle was only parked briefly and the period of time was not sufficient to establish a towing situation. Preparing a vehicle for towing typically takes a certain amount of time, so that a minimum time t has to elapse in order to establish a towing situation. If the period of time t is greater than the time threshold value $t_s$, step S6 branches to yes and a towing situation is recognized in step S9.

After recognition in step S9, the implementation of driver assistance functions that control intervention in the acceleration, deceleration or steering of the vehicle is then suppressed in the following step S10 so as to prevent unwanted evasive maneuvers or deceleration maneuvers during the towing operation. At the same time, after completion of step S9, the method is continued in step S2, which again checks whether the towing situation is still occurring. If step S6 recognizes that the period of time t since the last vehicle deactivation is not greater than the time threshold value $t_s$, step S6 branches to no and is continued in step S7. Step S7 determines based on the previous checks that the vehicle is not being towed because at least one of the requirements for recognition is not met. After this recognition that no towing situation is occurring, the method is continued in step S8 in which the current time and date are stored in an ignition-overarching memory. Storing the current time and the current date makes it possible, after the vehicle has been deactivated and the terminal 15 has been deactivated, i.e. the ignition has been switched off, to determine after reactivation how long the vehicle was deactivated in order to be able to ascertain the period of time t in step S6 when it is repeated.

Figure 2:
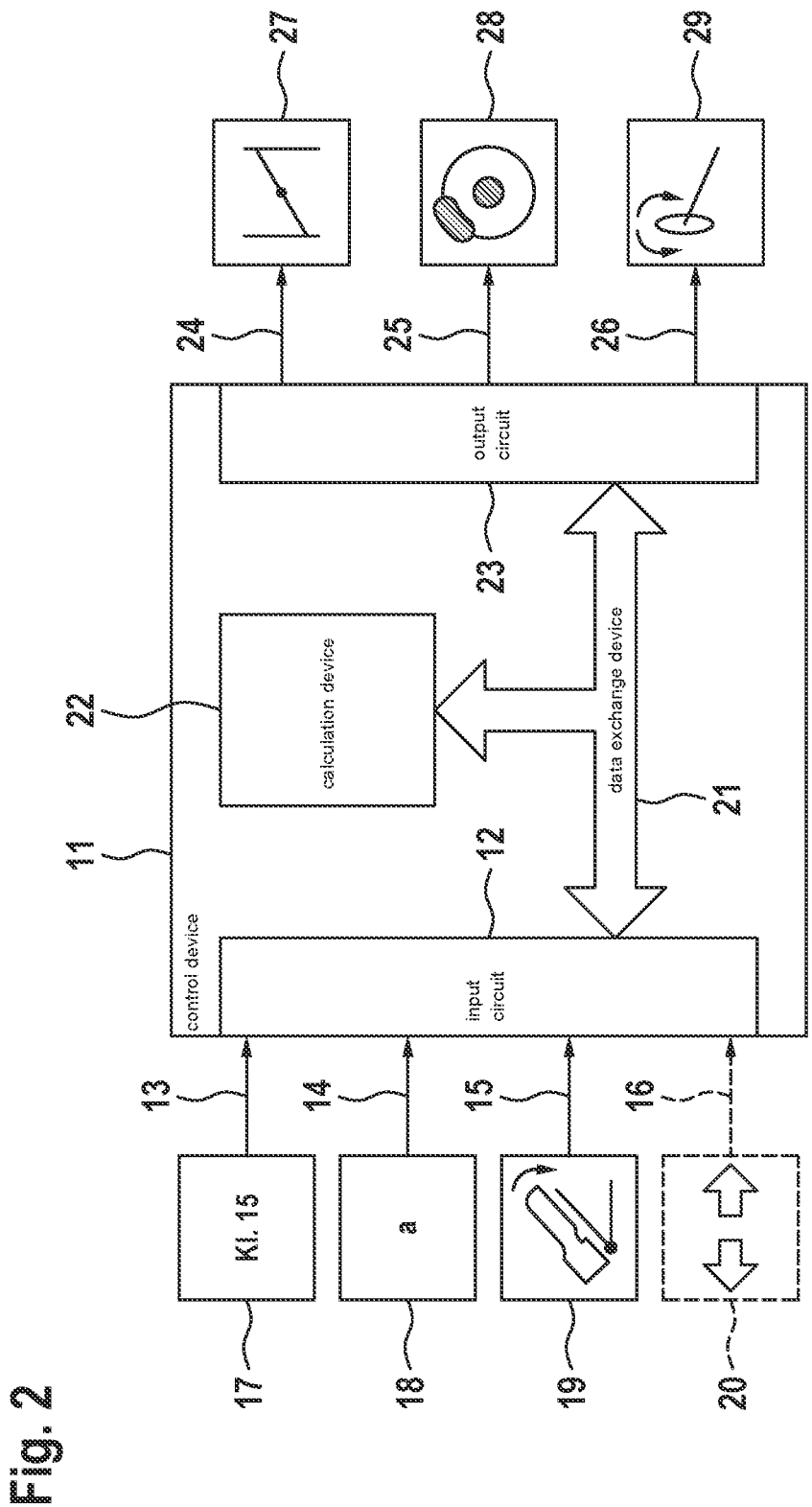
FIG. 2 shows a schematic block diagram of a further embodiment of the apparatus according to the present invention.

FIG. 2 shows a block diagram which describes an embodiment of the apparatus according to the present invention. A control device 11 can be seen, which has an input circuit 12. The control device 11 can be a control unit that is installed in the vehicle, for example as part of a sensor unit. The control device 11 can also be a central control unit in the vehicle, in which not only the inventive function is running but many other functions are running at the same time. It is also possible that the control device 11 is a control unit, for example an engine control unit, a navigation device or a head unit for vehicle operation, on which the method according to the present invention has been implemented and runs as an additional function. The input circuit 12 of the control device 11 is supplied with input signals 13 to 16 that originate from the vehicle devices 17 to 20. The intent of the input signal 13, for example, is to supply the control device 11 with the signal that relates to the activation of the ignition or the activation of the "terminal contact 15". For this purpose, an ignition sensor 17 or a "terminal 15" sensor 17 is provided that detects when the vehicle is activated and the ignition is switched on or the "terminal 15" is activated. The control device 11 is furthermore supplied with an input signal 14 that originates from a longitudinal acceleration sensor 18. This signal can also originate from an apparatus for vehicle dynamics control, for instance. The sensor 18 is used to recognize whether the vehicle is being accelerated or decelerated. Alternatively or in combination, the acceleration sensor 18 can also provide a vehicle speed signal v, which is supplied to the control device 11 as an input signal 14. The accelerator pedal sensor signal 19, which originates from an accelerator pedal sensor 11 and indicates whether the driver is currently actuating the accelerator pedal or the accelerator pedal is not being actuated, is supplied to the input circuit 12 of control device 11 as well. The input signal 16 that represents the activation state of hazard warning lights 20 is optionally also supplied to the input circuit 12. If the hazard warning lights 20 are activated, an input signal 16 relating to the activation of the hazard warning lights is supplied to the input circuit 12. The signals supplied to the input circuit 12 are fed via a data exchange device 21, which can advantageously be embodied as a data bus system, to a calculation device 22, which can be a microprocessor, a system ASIC (application-specific integrated circuit) or a microcontroller, for example. The method according to the present invention can be stored on the calculation device 22 as a software method, for example, so that, when the input data 13 to 16 are fed into the calculation device 22, the method according to the present invention runs and output signals are output. The output signals from the calculation device 22 are output via the data exchange device 21 to an output circuit 23 and the output signals 24, 25, 26 are output to downstream actuator devices 27, 28, 29. The actuator 27 can be an acceleration device that can influence an increase in the speed of the vehicle. This can be an electrically controlled carburetor, a throttle valve actuator or a fuel metering device, for instance.

The output signal 24 to the acceleration device 27 can, for example, be used to automatically accelerate the vehicle, such as when the accelerator pedal is actuated or when a torque request is made by a driver assistance system. The downstream actuator device 28 is a deceleration device that can decelerate the vehicle via the output signal 25. This can be realized using an electrically controllable brake system of the vehicle, for example. If a collision situation with an object in the surroundings is identified by a not depicted surroundings sensor system, the deceleration device 28 can be controlled by outputting a related output signal 25 and the vehicle can be slowed accordingly or emergency braking can be carried out to avoid the collision. An electric steering device 29 is provided as a further downstream actuator device, which can be controlled via the output signals 26 and can, in the event of a collision situation, for example execute an emergency evasive maneuver, possibly in combination with an automatic deceleration of the vehicle. If the calculation device 22 has determined that a towing situation is occurring, it is imperative that emergency evasive maneuvers, emergency braking maneuvers or combinations thereof do not take place, because they would disrupt the towing operation and jeopardize traffic safety. If a towing situation of the vehicle has been recognized in the calculation device 22, for example according to step S7 in FIG. 1, the output of the output signals 24, 25, 26 to the acceleration actuators 27, deceleration actuators 28 or steering actuators 29 is prevented. The prevention can consist of either suppressing these signals or deactivating their output. This ensures that no emergency braking or emergency evasive maneuver takes place during a towing operation in which the ego vehicle is following a preceding towing vehicle at a short distance.

What is claimed is:

1. A method for recognizing a towing operation of a vehicle, the method comprising the following steps:
   recognizing a towing operation based on: detecting an acceleration of the vehicle immediately after activation of an ignition of the vehicle, and recognizing that there is no actuation of an accelerator pedal of the vehicle and there is no torque request from a driver assistance system of the vehicle; and
   blocking, upon recognition of the towing operation, an automatic function that intervenes in an acceleration or a deceleration or a steering of the towed vehicle.

2. The method according to claim 1, wherein the recognition of the towing operation takes place when no driving operation has taken place between the activation of the ignition of the vehicle and the recognition of the towing operation in which a vehicle acceleration or a vehicle deceleration has been implemented using the accelerator pedal or a torque request from a driver assistance system.

3. The method according to claim 1, wherein recognizing the towing operation further includes detecting that hazard warning lights of the vehicle are activated.

4. The method according to claim 3, wherein the recognized towing operation remains active until: (i) the accelerator pedal is actuated or the driver assistance system is activated, and (ii) the hazard warning lights have been deactivated.

5. The method according to claim 1, wherein the recognized towing operation is activated when a minimum time since a last operation of the vehicle in which no towing situation was recognized has elapsed.

6. The method according to claim 1, wherein the recognized towing operation is reactivated when a towing operation was recognized in a preceding period of time in which the ignition was activated in the vehicle.

7. The method according to claim 1, wherein the automatic function that intervenes in the acceleration or the deceleration or the steering of the towed vehicle includes:
   an automatically triggered emergency braking, or an automatically triggered emergency evasion function, or a warning braking, or an automatic deceleration of the vehicle.

8. An apparatus for recognizing a towing operation of a vehicle, the apparatus comprising:
   a control device including a microprocessor or a system application-specific integrated circuit (ASIC) or a microcontroller, the control device configured to:
   recognize a towing operation if a directly preceding activation of the vehicle ignition was detected with an arrangement for recognizing an ignition state of the vehicle, and a vehicle acceleration was detected with an arrangement for detecting an acceleration of the vehicle, an arrangement for detecting an accelerator pedal actuation recognizes that an accelerator pedal of the vehicle has not been actuated, and an arrangement for detecting torque requests to the drive train recognizes that there is no torque request from a driver assistance system; and
   block, upon recognition of the towing operation, an intervention of an automatic function that intervenes in an acceleration or deceleration or steering of the towed vehicle.

9. A non-transitory machine-readable storage medium on which is stored a computer program for recognizing a towing operation of a vehicle, the computer program, when executed by a computer, causing the computer to perform the following steps comprising:
   recognizing a towing operation based on: detecting an acceleration of the vehicle immediately after activation of an ignition of the vehicle and recognizing that there is no actuation of an accelerator pedal of the vehicle and there is no torque request from a driver assistance system of the vehicle; and
   blocking, upon recognition of the towing operation, an automatic function that intervenes in an acceleration or a deceleration or a steering of the towed vehicle.

* * * * *